US009003534B2

(12) United States Patent
Zubrilin et al.

(10) Patent No.: US 9,003,534 B2
(45) Date of Patent: Apr. 7, 2015

(54) SYSTEM AND METHOD FOR SERVER-BASED ANTIVIRUS SCAN OF DATA DOWNLOADED FROM A NETWORK

(75) Inventors: Sergey A. Zubrilin, Moscow (RU);
Alexander A. Stroykov, Moscow (RU);
Sergey A. Vasilyev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 600 days.

(21) Appl. No.: 13/077,328

(22) Filed: Mar. 31, 2011

(65) Prior Publication Data

US 2012/0110667 A1 May 3, 2012

(30) Foreign Application Priority Data

Nov. 1, 2010 (RU) ................................ 2010144593

(51) Int. Cl.
*H04L 29/06* (2006.01)
*G06F 21/56* (2013.01)

(52) U.S. Cl.
CPC .............. *G06F 21/567* (2013.01); *G06F 21/56* (2013.01); *H04L 63/145* (2013.01); *H04L 63/0227* (2013.01)

(58) Field of Classification Search
USPC ......................................................... 726/25
See application file for complete search history.

(56) References Cited

U.S. PATENT DOCUMENTS

| | | | |
|---|---|---|---|
| 5,623,600 A | 4/1997 | Ji et al. | |
| 5,889,943 A | 3/1999 | Ji et al. | |
| 6,088,803 A | 7/2000 | Tso et al. | |
| 6,119,165 A | 9/2000 | Li et al. | |
| 7,020,895 B2 | 3/2006 | Albrecht | |
| 7,096,502 B1* | 8/2006 | Fox et al. | 726/25 |
| 7,188,367 B1 | 3/2007 | Edwards et al. | |
| 7,363,657 B2 | 4/2008 | Caccavale | |
| 7,392,544 B1 | 6/2008 | Pavlyushchik | |
| 7,567,573 B2 | 7/2009 | Foss | |
| 7,571,481 B2 | 8/2009 | Shimizu | |
| 7,640,588 B2 | 12/2009 | Saika | |
| 7,761,915 B2 | 7/2010 | Wu et al. | |
| 2002/0059371 A1 | 5/2002 | Jamail et al. | |
| 2002/0073338 A1* | 6/2002 | Burrows et al. | 713/201 |
| 2005/0149749 A1 | 7/2005 | Van Brabant | |
| 2007/0118903 A1 | 5/2007 | Bates et al. | |
| 2007/0294373 A1 | 12/2007 | Harrison | |
| 2008/0047009 A1 | 2/2008 | Overcash et al. | |
| 2008/0263670 A1* | 10/2008 | Stavrica | 726/24 |
| 2008/0301796 A1* | 12/2008 | Holostov et al. | 726/12 |
| 2012/0084859 A1* | 4/2012 | Radinsky et al. | 726/23 |

FOREIGN PATENT DOCUMENTS

| | | |
|---|---|---|
| EP | 2161672 | 3/2010 |
| WO | WO 9739399 | 10/1997 |
| WO | WO 2006107320 | 10/2006 |
| WO | WO 2008147737 | 12/2008 |

* cited by examiner

*Primary Examiner* — Yogesh Paliwal
(74) *Attorney, Agent, or Firm* — Patterson, Thuente, Pedersen, P.A.

(57) ABSTRACT

Aspect of the invention are directed to antivirus scanning, by a proxy server, of data downloaded from the network onto a PC workstation. The antivirus scanning is optimized for each scan by selecting an algorithm for that scan based on a determined overall likelihood that the downloaded data contains malicious code. Determination of the overall likelihood is augmented by the strength, or confidence, of statistical data relating to malware screening of results of previous downloads having similar parameters to the instant download.

16 Claims, 9 Drawing Sheets

US 9,003,534 B2

SYSTEM AND METHOD FOR SERVER-BASED ANTIVIRUS SCAN OF DATA DOWNLOADED FROM A NETWORK

PRIOR APPLICATION

This Application claims the benefit of Russian Federation Application No. 2010144593 filed 1 Nov., 2010.

FIELD OF THE INVENTION

The invention relates generally to information systems and associated methods and, more particularly, to computer security arrangements and techniques for antivirus scanning, at a security server, of data downloaded from a network.

BACKGROUND OF THE INVENTION

By virtue of the rapid development of network technologies, including the Internet, PC users can access and download an ever-increasing wealth of information and useful or entertaining programs and other digital content to their computers. Unfortunately, as the Internet continues to grow, the quantity and quality of malicious software distributed via the Internet also grows. Hackers or attackers making use of malware can pursue different objectives, from ranging from pranks and banal hooliganism to serious cybercrimes such as theft of funds from bank accounts.

One particular area of concern is the problem of the proliferation of malicious software in corporate networks. Infection of a computer in a corporate network can have an adverse impact not only on the morale of the user due to inability to work normally, but also on the company's bottom line due to material costs incurred in connection with setting up or repairing infected PCs. Still one of the greatest concerns is the risk of confidential data belonging to the company or to the company's customers being compromised by malware.

Accordingly, much effort has been, and continues to be, expended in protecting against malware. Today, many different approaches are known for antivirus scanning and scrubbing of files, including performing those actions on a remote computer or server such as a proxy server or gateway.

One challenge associated with these approaches, however, is the need to balance the thoroughness of the antivirus scanning against the associated time delay in delivering requested content to users through the malware-screening proxy server. U.S. Pub. No. 2008/0301796, for example, discloses adjusting the extensiveness of antivirus scanning at a proxy server based on various indicia, such as the content type, the content's security zone, infection history of the client or content, and threat level. When it is possible under this approach to reduce antivirus scanning extensiveness, the user-requested content may be delivered with reduced delay to the user.

While this approach, and similar approaches, offer the possibility of providing reduced antivirus screening (and therefore faster content delivery) when appropriate, challenges remain as to how the various indicia should be analyzed to provide efficient and appropriate selection of the antivirus scanning method. In addition, the approach of reducing the extent of malware screening in order to speed up content delivery creates the risk of failing to detect malware in a reduced scan. In view of these, and other, challenges, an improved approach for streamlining antivirus screening at the proxy server is needed.

SUMMARY OF THE INVENTION

One aspect of the invention is directed to antivirus scanning, by a proxy server, of data downloaded from the network onto a PC workstation. The antivirus scanning is optimized for each scan by selecting an algorithm for that scan based on a determined overall likelihood that the downloaded data contains malicious code.

Accordingly, in one type of embodiment, a computer-implemented apparatus for facilitating data transfer over a network between a destination computer system and a data source includes an intermediate computer system (including a processor circuit operatively coupled with a data storage circuit and network interface circuitry that is adapted to be communicatively coupled to a computer network) that is configured to implement a data reception module, a data transmission module, an antivirus module, and a data analysis module.

The data reception module is adapted to obtain, via the network interface circuitry, a data item to be received from the data source in response to a request by the destination computer system. The data transmission module is adapted to conditionally transmit, via the network interface circuitry, the data item to the destination computer system, wherein transmission of the data item is conditioned on a result of a security evaluation. The antivirus module is adapted to perform the security evaluation according to selectable ones of a plurality of malware detection techniques, which include at least one technique which is relatively computationally easy, and at least one technique which is relatively computationally difficult.

The data analysis module is adapted to collect a plurality of parameters that represent various characteristics relating to a security threat level, the data item, and/or the data source, and collect statistical information relating to previous malware detection results for the data item and/or the data source. Further, the data analysis module is adapted to calculate, based on the plurality of parameters and on the statistical information, an overall risk probability of whether the data item is infected with malware. Calculation of the overall risk probability is generally computationally easier than the at least one relatively computationally easy malware detection technique.

The antivirus module is further adapted selectively apply at least one malware detection technique from among the plurality of malware detection techniques based on the overall risk probability, such that the selectively applied at least one malware detection technique has a level of computational difficulty that generally corresponds to the overall risk probability.

The analysis module is further adapted to analyze the statistical information relating to the previous malware detection results for the data item and/or the data source and, if the statistical information meets predetermined confidence criteria, to invoke at least one priority rule that assigns an override value for the overall risk probability. Invocation of the at least one priority rule permits fast and accurate determination of the overall risk probability and, in turn, fast and accurate selection of the most appropriate antivirus detection technique(s).

In another aspect of the invention, a computer-implemented apparatus for facilitating data transfer over a network between a destination computer system and a data source includes an intermediate computer system that is configured to implement a data reception module, a data transmission module, an antivirus module, and a data analysis module. The data reception module is adapted to obtain, via the network interface circuitry, a data item to be received from the data source in response to a request by the destination computer system. The data transmission module is adapted to conditionally transmit, via the network interface circuitry, the data item to the destination computer system, wherein transmission of the data item is conditioned on a result of a security evaluation.

The antivirus module is adapted to perform the security evaluation of the data item; and the data analysis module is adapted to track a destination-specific history of the data item and security evaluation results for that data item, and to compare the destination-specific history to subsequent security evaluation results relating to the same data item and, in response to the comparison indicating a past failure of the security evaluation, to provide corrective action instructions to be transmitted to the destination computer system for addressing the past failure.

In a further aspect of the invention, a computer-implemented apparatus for facilitating data transfer over a network between a destination computer system and a data source includes an intermediate computer system configured to implement: a data reception module adapted to obtain, via the network interface circuitry, a data item to be received from the data source in response to a request by the destination computer system; a data transmission module adapted to conditionally transmit, via the network interface circuitry, the data item to the destination computer system, wherein transmission of the data item is conditioned on a result of a security evaluation; an antivirus module adapted to perform the security evaluation on the data item according to selectable ones of a plurality of malware detection techniques, wherein the plurality of malware detection techniques include at least one technique which is relatively computationally easy, and at least one technique which is relatively computationally difficult; and a data analysis module adapted to collect a plurality of parameters that represent various indicia of malware risk relating to the data item, collect statistical information relating to previous malware detection results for the data item and/or the data source, and calculate, based on the plurality of parameters and on the statistical information, an overall risk probability of whether the data item is infected with malware, wherein calculation of the overall risk probability is generally computationally easier than the at least one relatively computationally easy malware detection technique.

The antivirus module is further adapted to selectively apply at least one malware detection technique from among the plurality of malware detection techniques based on the overall risk probability such that the selectively applied at least one malware detection technique has a level of computational difficulty that generally corresponds to the overall risk probability. When the overall risk probability is low, the antivirus module is adapted to selectively apply a malware detection technique on a sampling basis according to an adjustable sampling interval.

In yet another aspect of the invention, a method is provided for automatically screening, in a proxy server, a data item requested to be downloaded to a destination computer from a data source. The method includes:

performing a security evaluation on the data item according to selectable ones of a plurality of malware detection techniques, where the plurality of malware detection techniques include at least one technique which is relatively computationally easy, and at least one technique which is relatively computationally difficult;

collecting a plurality of parameters that represent various indicia of malware risk relating to the data item;

collecting statistical information relating to previous malware detection results for the data item and/or the data source; and calculating, based on the plurality of parameters and on the statistical information, an overall risk probability of whether the data item is infected with malware, where calculation of the overall risk probability is generally computationally easier than the at least one relatively computationally easy malware detection technique;

selectively applying at least one malware detection technique from among the plurality of malware detection techniques based on the overall risk probability, where the at least one malware detection technique has a level of computational difficulty that generally corresponds to the overall risk probability; and analyzing the statistical information relating to the previous malware detection results for the data item and/or the data source and, if the statistical information meets predetermined confidence criteria, invoking at least one priority rule that forces a certain malware detection technique notwithstanding the overall risk probability.

Aspects of the invention allow for more efficient data item malware screening and faster downloads, without having to accept substantial compromises in security. The user experience is thus improved. A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

Figure 1:
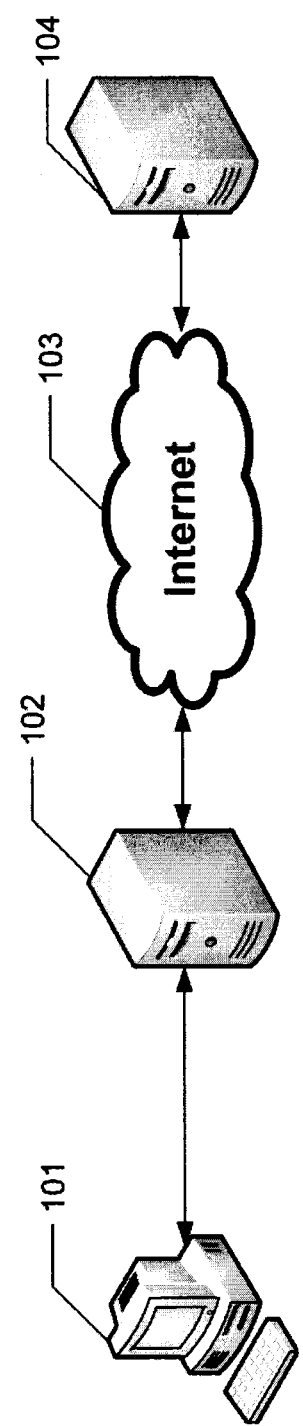
FIG. 1 is a block diagram illustrating at a general level an exemplary system for antivirus scanning of data downloaded from a network on a proxy server according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 is a block diagram illustrating at a general level an exemplary system for antivirus scanning of data downloaded from a network on a server according to one embodiment. As will be described in the context of an illustrative embodiment, one aspect of the invention is directed to the examination, at the server side, of data which are downloadable using conventional means such as, for instance, when a user selects a file to be downloaded using a Web browser. The exemplary system according to one embodiment includes PC workstation 101, proxy server 102, network 103 (such as the Internet) and the data server 104.

To download the required data from data server 104, which can be achieved via HTTP, FTP, SMTP, POP3 or other such services, PC workstation 101 generates and sends a request to data server 104 requesting to download data via proxy server 102 over the Internet 103. In response to the request, data server 104 sends the necessary data via the Internet to proxy server 102. Before relaying data received from data server 104 to PC workstation 101, the data is checked for malicious code on the proxy server 102.

Figure 2:
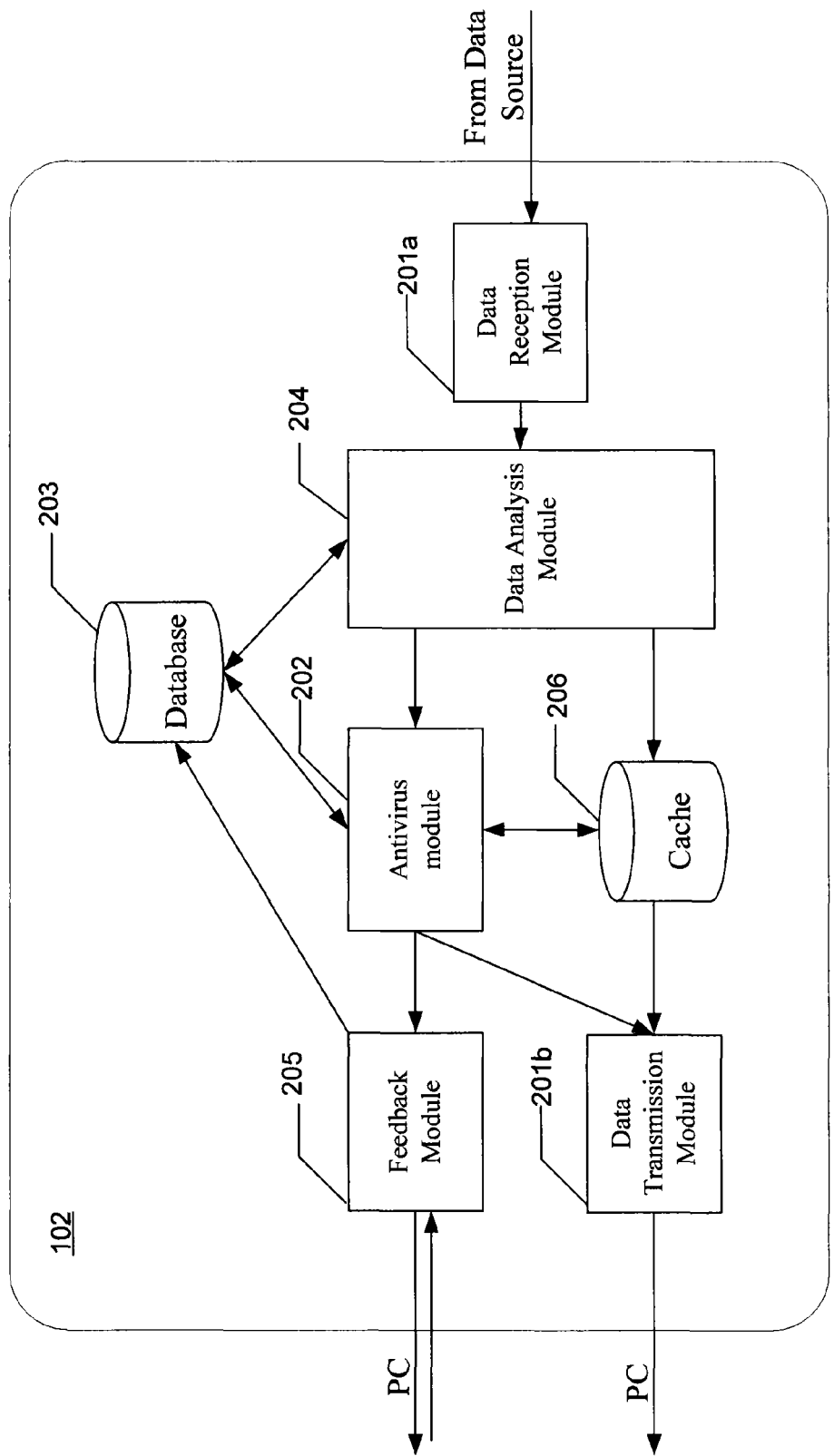
FIG. 2 illustrates the main components of the proxy server of FIG. 1 according to one type of embodiment.

FIG. 2 illustrates the main components of proxy server 102 according to one type of embodiment. Proxy server 102 includes data reception module 201a, data transmission module 201b, antivirus module 202, proxy server database 203, data analysis module 204, feedback module 205 and cache 206. Data module reception module 201a, data transmission module 201b, antivirus module 202, data analysis module 204, and feedback module 205 are all are implemented as modules. The term "module" as used herein means a real-world device, component, or arrangement of components implemented using hardware, which may include an application specific integrated circuit (ASIC) or field-programmable gate array (FPGA), for example, or a microprocessor system under the control of and a set of instructions to implement the module's functionality, which (while being executed) transform the microprocessor system into a special-purpose device for carrying out the module's functions. A module can also be implemented as a combination of hardware alone and software-controlled hardware, with certain functions facilitated by the hardware alone, and other functions facilitated by a combination of hardware and software. Accordingly, each module can be realized in a variety of suitable configurations, and should not be limited to any particular implementation exemplified herein unless specifically claimed as such.

The data transmitted, by data server 104 in response to a request through the Internet 103, to PC workstation 101 arrives initially at proxy server 102 and, more specifically, at data reception module 201a. The received data is then passed to data analysis module 204. At this point, a determination is made as to the overall probability that the downloaded data contains malicious code. Data analysis module 204 examines parameters of the downloaded data such as, for example, the file extension of the downloaded file, the source of downloaded file, and the size of downloaded file, the filename, and the file's checksum (e.g., CRC, hash, etc.). Parameters of the downloaded data that can be examined by the data analysis module 204 according to various embodiments of the invention are not limited to these examples.

Data analysis module 204 accesses an updateable database 203 of the proxy server, which contains rules for determining the overall likelihood that the downloaded data contains malicious code. In one type of embodiment, these rules are based on three key properties, such as the extension of downloaded file, the security of the source of the downloaded file, and the current level of threats. In variations of this embodiment type, these rules may be based on fuzzy logic or classical (Boolean) logic. The database 203 of the proxy server also contains rules for determining the depth, or comprehensiveness, of the anti-virus scan, which depends on the overall likelihood that the downloaded data contains malicious code.

Figure 3:
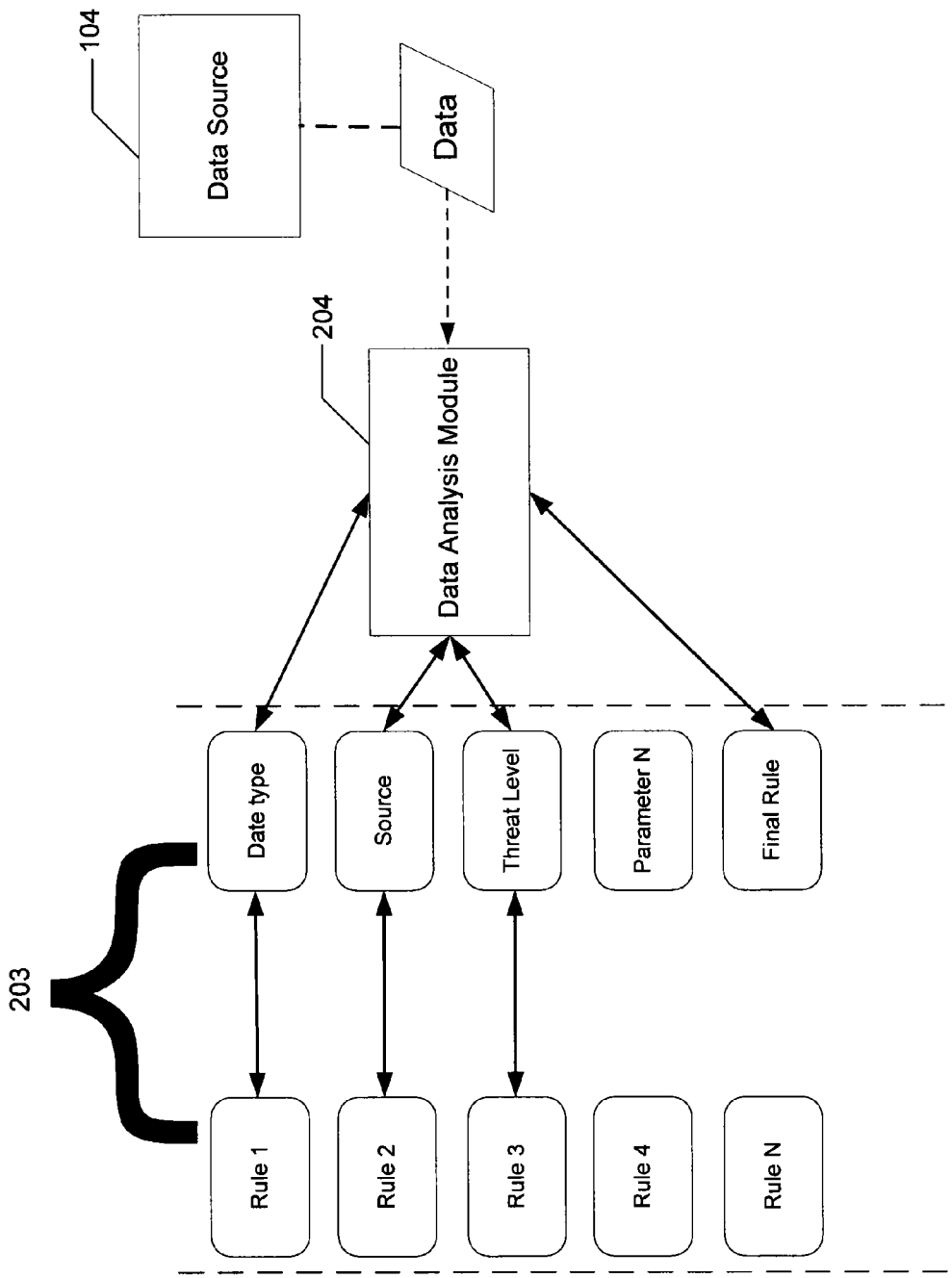
FIG. 3 is a diagram illustrating the interaction between a data server and the proxy server of FIGS. 1 and 2 according to one embodiment.

An exemplary process according to one embodiment for determining the overall likelihood that the downloaded data contains malicious code is illustrated in more detail in FIG. 3, which diagrams the interaction between data server 104, data analysis module 204, and database 203 of the proxy server. In this example, a user of PC workstation 101 is trying to download data from data server 104 at a particular web address. The data that the user wants to download is an executable file with the file extension .EXE, for example Hello.exe. This file is downloaded in typical fashion, that is, the PC user 101 clicks on the link "download file" in the Web browser.

Relevant information about the downloaded file and its source is identified by the data analysis module 204, which later compares this information with data from database 203 of the proxy server. To aid in determining the overall likelihood that the downloaded data contains malicious code, the database 203 of the proxy server has three main attributes: "Data Type", "Source" and "Threat Level". The database 203 of the proxy server, depending on its particular implementation, may contain other attributes such as, for example, "Size of downloaded data", "The level of protection" and the like.

Depending on the particular type of downloaded data, its source, and threat level in the database 203 of the proxy server, one or more rules are selected from among Rule 1, Rule 2, Rule 3, Rule 4, . . . Rule N. This selection may be achieved through use of fuzzy logic techniques. When applied, each rule determines its own probability level. Then the attributes, defined in this way, transition from being fuzzy into precise values, with each value making a contribution to the overall determination of the likelihood that the downloaded data contains malicious code. The overall probability may then be re-translated into a fuzzy representation.

Figure 4:
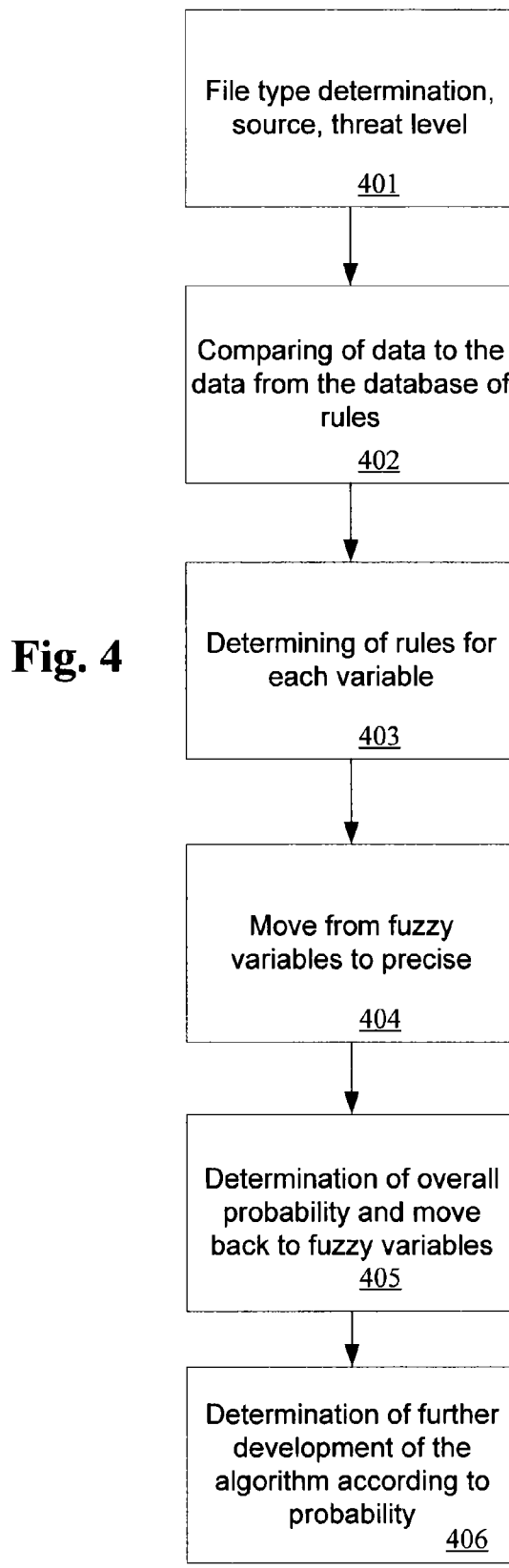
FIG. 4 is a flow diagram illustrating an algorithm to determine the overall likelihood that the downloaded data contains malicious code, based on fuzzy logic according to one embodiment.

FIG. 4 is a flow diagram illustrating an algorithm according to one embodiment to determine the overall likelihood that the downloaded data contains malicious code, based on fuzzy logic. The illustrated process begins after the PC user clicks in the Web browser on a "download file" link, the data from data server 104 are transmitted to the proxy server, where data analysis module 204 receives the data. At block 401, module 204 examines the attributes of the downloaded data file. For example, one attribute to be determined is the file extension (e.g., .EXE, .DLL, .BAT, or the like). Another of the attributes relating to the downloaded data file is the address from where the file was sent. Determination of the downloaded data's attributes in this embodiment is significantly more computationally efficient (i.e., easier) compared with brute-force scanning the downloaded data for the presence of malware.

At 402, data analysis module 204 compares the determined attribute data with the data from the database 203 of the proxy server to determine if any particular predetermined rules exist to be applied in analysis of the downloaded data. Upon comparison of the downloaded data with the database records, at block 403, for each of the attributes, rules are selected and applied. In one particular embodiment, the rules are selected and applied using fuzzy logic. The application of each rule to each attribute produces a linguistic variable "risk probability", to which will correspond, for example, three definitions, such as: "low", "medium" and "high". A similar rule for the attribute "data type", namely for the file extension (e.g., .EXE) may be the following logical rule: "IF allowing the downloading of filename.EXE, THEN the probability that the downloaded file contains malicious code is high."

What can be known of the attribute "source" is that the source falls under one of three categories: well-known and safe, well-known and dangerous, or not known and thus indeterminable. In this regard, the linguistic variable "probability" would also be consistent with three definitions, such as: "low", "medium" and "high". One example of a rule relating to unknown sources is as follows: "If the source of the downloaded file is not known, THEN the probability that the downloaded file contains malicious code is medium.

Even when the source is unknown the overall classification of the probability of the downloaded file containing malware can be weighed by taking into consideration other factors. For example, the level of threats may be used to dynamically assign a threat level to an unknown source. Since the database 203 of the proxy server is periodically updated (with the updates including data on the present level of threats) the parameter "level of threats" may be substituted for the unknown threat level of a unknown source.

In one embodiment, the parameter "level of threats" is measured on a scale of 1 to 10. The linguistic variable "probability" in this case would also correspond to three definitions, such as: "low", "medium" and "high". An exemplary rule for the variable "level of threats" is as follows: If the threat level is at least 8, THEN the probability that the downloaded file contains malicious code is high. This output is expressed in terms of membership in a fuzzy set. In order to use the result in an algorithm utilizing conventional logic, a process of defuzzification is applied to convert the fuzzy result into a numerical value. A wide variety of defuzzification techniques are known in the art, and it is contemplated that any suitabnle technique, known or arising in the future, may be applied. At block 404 the range of values from database 203 of the proxy server is determined, which corresponds to the definitions that belong to the resulting linguistic variable. For example, it is determined that the value of "low" for the linguistic variable "probability" will be matched by a value in the range from 1% to 30%, the value of "average" for the linguistic variable "probability" will be matched by a value in the range from 31% to 50%, the value of "high" for the linguistic variable "probability" will be matched by a value in the range from 51% to 99%. It should be noted that this is a simple illustrative example, and in various other embodiments, the number of values for the linguistic variable "probability" may be greater. The range of values for these values of the linguistic variable "probability" for each variable, such as "Data Type", "Source", "Threat Level" can vary.

Next, at block 405, the values that will be sent to data analysis module 204 are selected. Data analysis module 204, in its simplest form, calculates the average value of these probability values, and this value will be the overall probability that the downloaded data contains malicious code. The database 203 of the proxy server also contains the linguistic variable "overall probability", to which correspond, for example, five definitions, such as "low", "low-to-medium" "medium", "medium-to-high" and "high". And the value ranges, which correspond to a particular value of linguistic variable "overall probability" are set. They also are in the database 203 of the proxy server. For example, in our case, the definition of "low" would be consistent with the overall probability range from 1% to 15%, the definition of "low-to-medium" is equivalent to the overall probability in the range from 16% to 30%, the definition of "average" would be consistent with the overall probability of 31% to 40%, the definition of "medium-to-high" would be consistent with the overall probability of 41% to 50%, the definition of "high" would be consistent with the overall probability of 51% to 99%. Let the overall probability in our example, after calculating the average value, equal to 65%. Accordingly, at block 405 we move from the explicit value of the variable "overall probability" of 65% to the fuzzy value of "high". This block is called fuzzification. Next, at block 406, depending on the overall probability, the further development of the algorithm for antivirus scan of data downloaded from the network on the server is selected.

In another particular implementation of the system for antivirus scanning on the server side of data downloaded from the network, the determination of the overall likelihood that the downloaded data contains malicious code, may be based on conventional logic.

Figure 5:
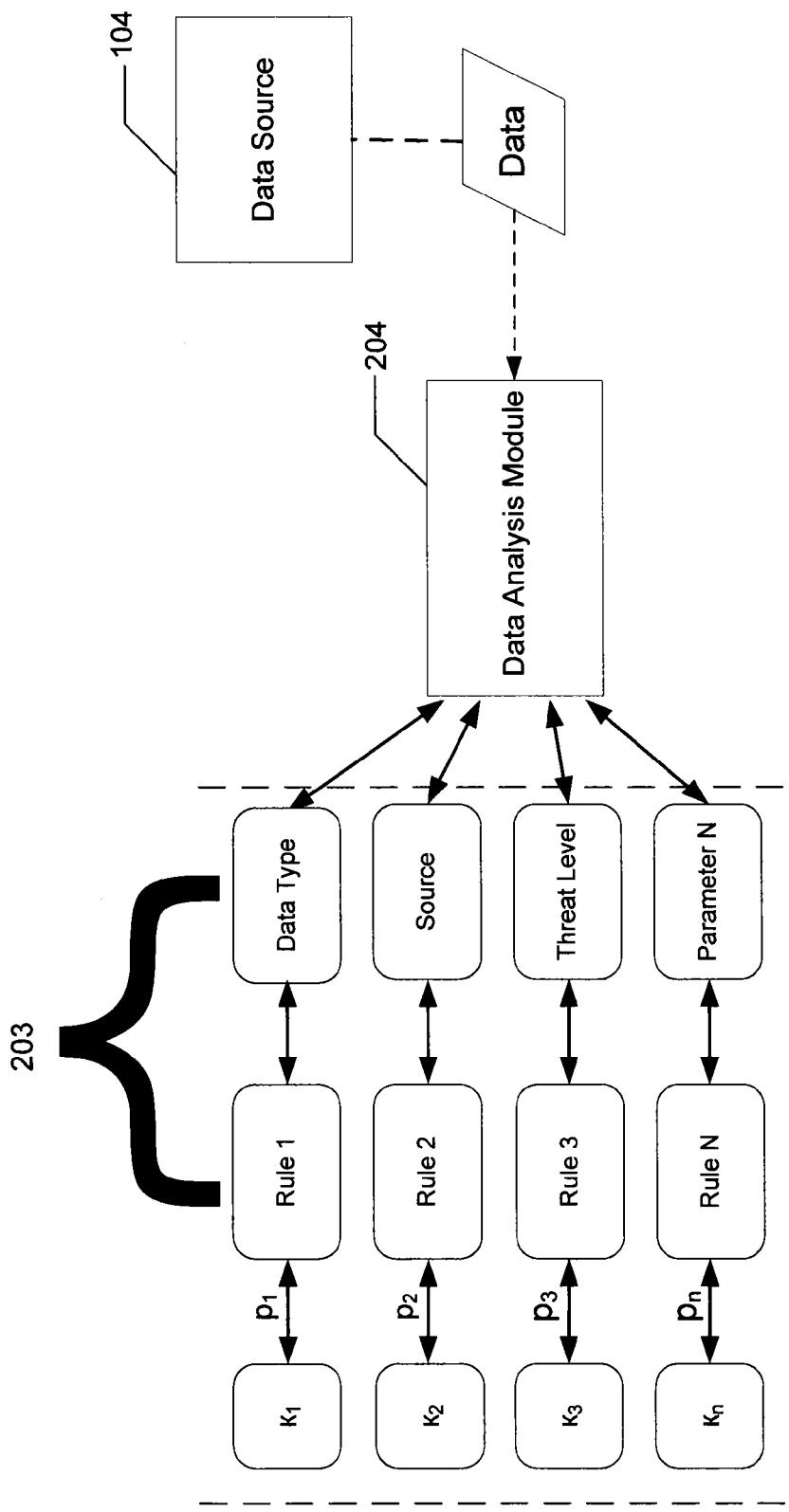
FIG. 5 illustrates an example of interaction between the data server, a data analysis module, and a database of the proxy server of FIGS. 1-2 according to one embodiment.

FIG. 5 illustrates an example of interaction between the data server 104, data analysis module 204 and the database 203 of the proxy server according to one embodiment. Data (metadata, information) about the downloaded file and its source is determined by data analysis module 204, which then compares it to the data in the database 203 of the proxy server. The database 203 of the proxy server has three main variables: "Data Type", "Source" and "Threat Level", which are used to determine the overall likelihood that the downloaded data contains malicious code. Depending on the particular type of downloaded data, its source and level of threats in the database, the proxy server 203 selects a set of rules such as Rule 1, Rule 2 and Rule 3 that are based on conventional logic. Each rule corresponds to a certain probability $p_i$ (i=1 ... n, where n is the number of the last rule), which can only be changed when changing the rule itself after the updating of the database 203 of the proxy server. The coefficient of $k_i$ applied to the rule, affects the weighting of the value of probability determined by the rule. The coefficients of $k_i$ are also found in the database 203 of the proxy server and updated by the security services provider to tune the accuracy of the system's decision-making. Each download of data may trigger several rules at once. Each rule contributes to the formation of the final conclusion about the overall probability that the data may contain malicious code.

The contribution of each rule includes two components: the basic probability p and the coefficient k. Later, the contributions from each rule are summed; forming the overall likelihood of whether the downloaded data contains malicious code. If the overall probability exceeds a certain threshold value, then the download process is found to be dangerous, and the corresponding downloadable object is deemed to contain malicious code. The threshold can be preset at data analysis module 204, or data analysis module 204 can request data on the threshold values from the database of the proxy server 204, which can be stored there and regularly updated.

Figure 6:
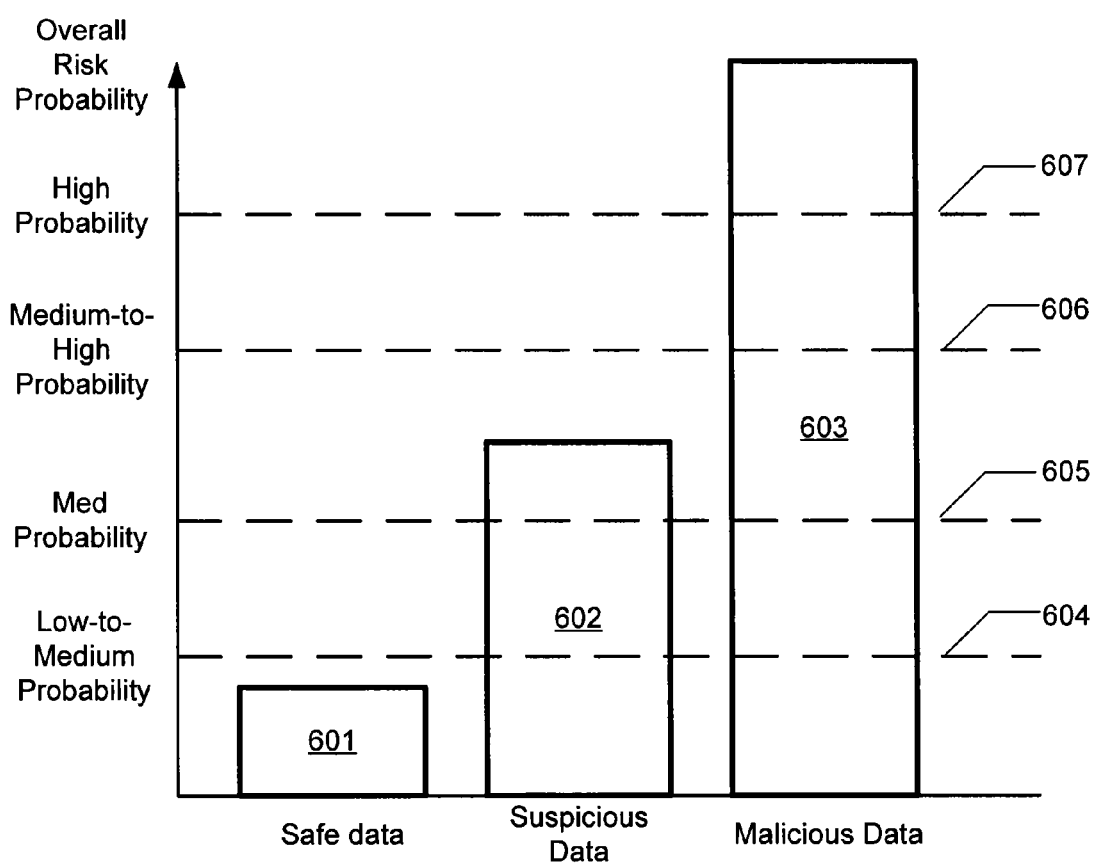
FIG. 6 is a chart illustrating an example of classification criteria to be applied to downloaded objects, related to the overall risk probability.

FIG. 6 illustrates an example of classification criteria to be applied to downloaded objects, related to the overall risk probability. For example, data analysis module 204 can be preset with four thresholds of the overall risk probability, such as high probability 607, medium-to-high probability 606, medium probability 605 and low-to-medium probability 604. Depending on the overall risk probability, as determined through application of the rules for downloaded data, three main classifications can be defined. If the overall probability is lower than the threshold of probability of low-to-medium 604, then the downloaded data, with a high degree of confidence, does is categorized as safe 601, i.e., not containing malicious data. If the overall probability is higher than the threshold of low-to-medium 604, but lower than the threshold of medium-to-high 606, then the downloaded data is deemed as possibly containing malicious code, and is categorized as suspicious 602. If the overall probability is higher than the threshold of medium-to-high 606, then the downloaded data, with a high confidence, is deemed to contain malicious code is categirized as malicious 603, i.e., containing malicious code.

In one embodiment, if the overall risk probability exceeds the high probability threshold 607, then the system will instruct antivirus module 202 to apply a more in-depth antivirus scanning algorithm to the data downloaded from the network. If, on the other hand, the overall risk probability does not exceed the threshold of high probability 607, then the system will instruct antivirus module 202 to apply a faster antivirus scanning algorithm.

Figure 7:
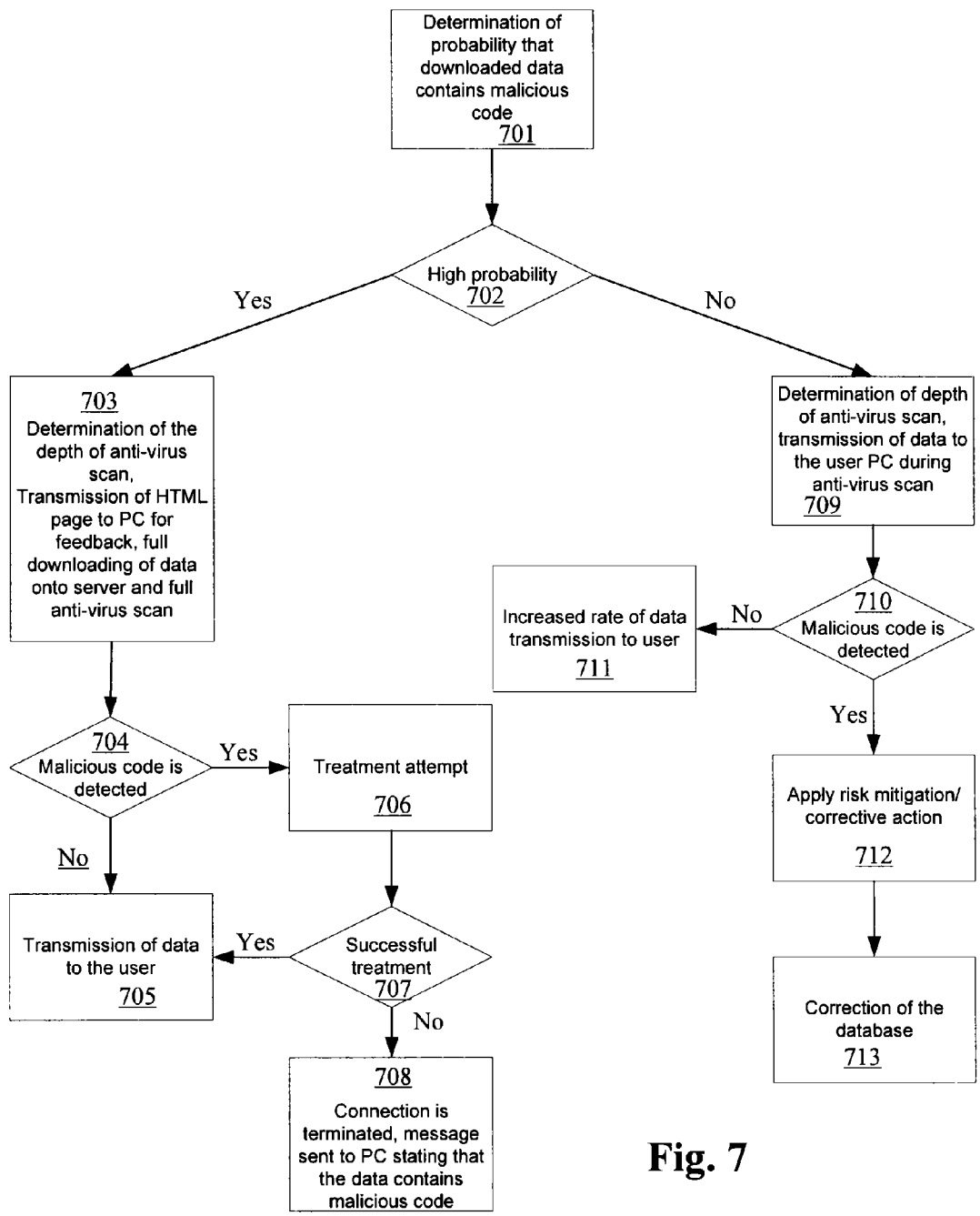
FIG. 7 is a flow diagram illustrating an algorithm for selective depth antivirus scanning according to one embodiment.

FIG. 7 is a flow diagram illustrating an exemplary algorithm for antivirus scanning, on proxy server 102, of data downloaded from the data source 104 via network 103. At block 701, data analysis module 204 of proxy server 102 computes an overall probability that the downloaded data contains malicious code. The process can be initiated in response to a direct request by the user of PC workstation 101 to downloaded a file, such as by clicking inside a Web browser on a link "download file".

If, at block 702, data analysis module 204 determines that the overall probability that the downloaded data contains malicious code is high, the algorithm continues to block 703, where data analysis module 204 transmits information indicative of the high overall likelihood that the downloaded data contains malicious code to the antivirus module 202. In response, antivirus module 202 and data analysis module 204 initiate operation in a high-risk mode. In this mode, according to one example embodiment, data analysis module 204 fully downloads data from the data server 104 into its cache 206. At the same time, antivirus module 202 initiates feedback module 205, which transmits feedback information relating to the antivirus scanning to the PC workstation 101, such as information informing the user of PC workstation 101 that an antivirus scan is in progress. The feedback information can further include a progress indicator showing the download progress of the complete set of data to cache 206.

The form of this feedback information may be an HTML-page, an HTML-page with Javascript, an HTML-page with AJAX, or the like. This HTML-page automatically opens in the Web browser on PC workstation 101 and displays the progress of downloading the requested data to the proxy server 102, namely, cache 206, as well as their further antivirus scan after the downloading by the antivirus module 202, thereby providing information accounting for any apparent delay in transferring the file to the user, or simply apprising the user of the operation of the system's data security.

Once data is downloaded to cache 206, antivirus module 202 performs an antivirus scan. Next, at block 704 the scan is completed, and, if malicious code isn't detected, then in block 705 antivirus module 202 initiates data transfer module 201b, which sends data to the PC workstation 101 from cache 206. The cache 206 is then cleared. If malicious code is detected, then antivirus module 202 attempts to treat the infection of the downloaded data at block 706. If, at block 707, the treatment is successful, then at block 705 data transmission module 201b transmits data to PC workstation 101 from the cache 206. If at block 707 the treatment of infected data fails, then at block 708 the antivirus module 202 initiates the feedback module 205 to transfer to the PC workstation 101 messages that informs the user that the downloaded data contains malicious code. The downloaded data is kept from being accessible to the user, the connection terminated, and cache 206 is cleared.

If, at block 702, data analysis module 204 determines that the overall probability that the downloaded data contains malicious code is low, the algorithm will continue to block 709. At block 709 data analysis module 204 transmits information about the low likelihood that the downloaded data contains malicious code to the antivirus module 202. After that, the antivirus module 202 and data analysis module 204 initiate operation in low-risk mode. Data analysis module 204 begins to transmit data received from the data server 104 via the antivirus module 202 to data transmission module 201b, which in turn will transmit the data to PC workstation 101. The antivirus module 202 passes data to the data transmission module 201b for transmission in small amounts even before the end of the full scan. Depending on the overall likelihood that the downloaded data contains malicious code, the depth of the scan is adjusted, which in turn affects how quickly data could be transmitted to the PC workstation 101. Such an adjustment occurs at blocks 703 and 709, respectively. Data analysis module 204 provides an indication of the overall risk probability to antivirus module 202, which in turn, based on the rules for these probabilities, determines the depth of antivirus scan. With a higher overall risk probability, the scan is adjusted to be more extensive. Adjusting the depth of antivirus scanning can be done by adding or taking away different types of data analysis, such as signature analysis, heuristic analysis, and other known mechanisms for identifying malicious code, or by adjusting the comprehensiveness of a given type of analysis.

Determination of the depth of antivirus scan, depending on the overall likelihood that the downloaded data contains malicious code, may be determined by rules based both on classical and on fuzzy logic, which are found in database 203 of the proxy server. For example, in the described implementation of the system for antivirus scan of the data downloaded from the network on the server, there may be provided a rule from the database 203 of the proxy server which states that if the overall probability that the downloaded data contains malicious code (as determined by data analysis module 204) is high, then the depth of the antivirus scan should be set to maximum level.

The system's behavior is markedly different if the overall probability that the downloaded data contains malicious code is low. In this case, the data may be scanned by the antivirus module 202 while it is being transferred to PC workstation 101. The extensiveness of the antivirus scanning is also adjustable. As described above, for a given case, the linguistic variable "overall probability" corresponds to values of "low", "low-to-medium" "medium," "medium-to-high" and "high". The first four values are relevant for developing the algorithm, involving the transfer of data to the PC during the scanning process. For each such determination there is a rule in the database 203 of the proxy server. For example, if the overall probability is consistent with the value of "low", then the antivirus module 202, based on the relevant rules from the database 203 of the proxy server, will complete a fast malware signature scan. Alternatively, if the total probability corresponds to the value of "medium-to-high", then antivirus module 202, based on the relevant rules from the database 203 of the proxy server, will perform the a more thorough check.

Depending on the depth of antivirus scan, the rate of data transfer during the scanning process changes. If the scan is most extensive, the speed of data transmission to the PC workstation 101 during the scanning process is set to be relatively slow. If the scan is not very deep, for example, only the signature analysis, the data transmission rate on the PC workstation 101 during the scanning process is substantially higher. Also in a particular embodiment, the depth of the antivirus scan can be set by the user.

In one embodiment, streaming data verification by the antivirus module 202 during transmission of data from data analysis module 204 to a PC workstation 101 via the antivirus module 202 and the data transmission module 201b is carried out. Thus, the downloaded data is disaggregated in the analysis module 204 into blocks and these blocks are sent to the antivirus module 202, where the data blocks are checked in sequence and, if the downloaded data does not contain malicious code, are sent to the PC workstation 101 via the data transmission module 201b. A similar process is carried out for all blocks into which the data received from data server 104 is disaggregated.

Further, if at block 710 during the antivirus check by the antivirus module 202 no malicious code in the data transmitted to the PC workstation 101 is detected, then at block 711, once the scanning is complete, the data transmission module 201b will transmit the remaining (as-yet un-transmitted) data to the PC workstation 101 at an increased rate due to the absence of the scan, which otherwise causes the transmission rate to be reduced.

If at block 711 the antivirus module 202 finds that the data contains malicious code, then at block 712 the system mitigates risk due to the malicious code. In one approach, the connection is terminated, and the antivirus module 202 via the module of data transmission 201b transmits to the PC workstation 101 information that the downloaded data contains malicious code. This approach applies in situations where treatment of infected data is not practicable or not desired.

In another approach, at block 712, the connection is not terminated immediately. Instead, antivirus module 202 treats the complete set of data, and data transmission module transmits the treated file to PC workstation 101, along with a notification to be displayed to the user of PC workstation 101, and/or instructions for PC workstation 101 to replace the originally-streamed data with the treated data. Prior to transmission of the treated data, or prior to treatment of the infected data, a notification may be transmitted to PC workstation 101 to provide its user a notification that there will be a delay due to either re-transmission of the data, or due to treatment ad re-transmission of the data. To facilitate providing a notification, a pop-up window or other suitable message may be initiated in the browser of PC workstation 101. To facilitate a more advanced security functionality, PC workstation 101 may be programmed to receive and respond to an instruction from antivirus module 202. In one such example, PC workstation 101 runs a Web browser plug-in that enables receipt and execution of the instruction to receive and replace the originally-streamed data with treated data.

In another embodiment, upon detection of malicious code in the data being uploaded to PC workstation 101, antivirus module 202, via data transmission module 201b, transmits an indication of the data being infected to PC workstation 101. The client-side software running on PC workstation 101 (e.g., via Javascript or Web browser plug-in) causes that computer to respond to the indication by quarantining the downloaded data to be treated immediately after completion of the download, or at a later time. In a related embodiment, antivirus module 202 transmits instructions for performing the treatment along with the indication that the data is infected. This particular approach may be particularly useful in cases where the data being transferred is so large that the time to re-send the treated version of that data is greater than the time it would require to treat the data locally at PC workstation 101.

If, while the overall risk probability that the downloaded data contains malicious code is low, the antivirus module 202 nevertheless detects malicious code in the data, then the system recognizes that the overall risk probability was determined incorrectly, and the rules upon which this the overall probability was based are deemed to be obsolete. Therefore, at block 713, a correction of the database 203 of the proxy server takes place. In one embodiment, the rules based on fuzzy logic, which were chosen to determine the overall probability, are sent to the security services provider for analysis and adjustment. If the rules are based on classical logic and the summary rating of rules is important to determine the overall probability, then only the coefficients $k_i$ can be sent to the service provider for editing.

Thus, in one embodiment, in addition to regular updates of the database 203 of the proxy server for the reliability of detection, feedback is sent to the security service provider for adjusting the rules, if the rules which determine the overall risk probability and, ultimately, the antivirus scan as a whole, are not valid. The service provider may adjust the rules manually, based on a review and analysis by a human analyst. In other embodiments, automated systems either assist the human analyst in determining the corrections to make to the rules, or perform adjustment of the rules automatically without human involvement In one particular type of embodiment, database 203 of the proxy server may collect statistical information about the downloaded data. Typically, data is downloaded to a large number of PC workstations 101 via a proxy server 102. Identical data can be downloaded onto many PCs 101, for example, the same exact files from the same data server 104. The collected statistics in this case can allow the system to determine, in advance, whether a given user is downloading a file containing malicious code.

In one particular implementation, database 203 of the proxy server may be divided into two interrelated sections. The first section contains updateable rules that determine the overall likelihood that the downloaded data contains malicious code, as well as rules for determining the depth of the antivirus scan, depending on the overall likelihood that the downloaded data contains malicious code. A second section contains history and statistical data on all previously-downloaded objects, including those that contain malicious code. Such information may include names of downloaded files, the checksums of downloaded data, the IP address of the data server 104, the number of downloads of each file, the number of downloads from the same data server 104, the number of files containing malicious code for each data server 104, and the number of files not containing malicious code, and so on.

The first section of the database 203 of the proxy server, containing the rules for determining the overall risk probability that the downloaded data contains malicious code, as well as rules for determining the depth of antivirus scan (depending on the overall risk probability that the downloaded data contains malicious code) maintains priority rules for statistical data of the second section. Such rules can be based either on fuzzy, or on conventional logic, or on both. In one embodiment, users of PC workstation 101 are provided an interface that facilitates setting up their own rules, or define parameter values for predefined rules. One such rule, for example may be: "IF the source of the downloaded file is known and safe and the number of downloads of this file is more than 50, THEN the likelihood that the downloaded file contains malicious code is low".

Figure 8:
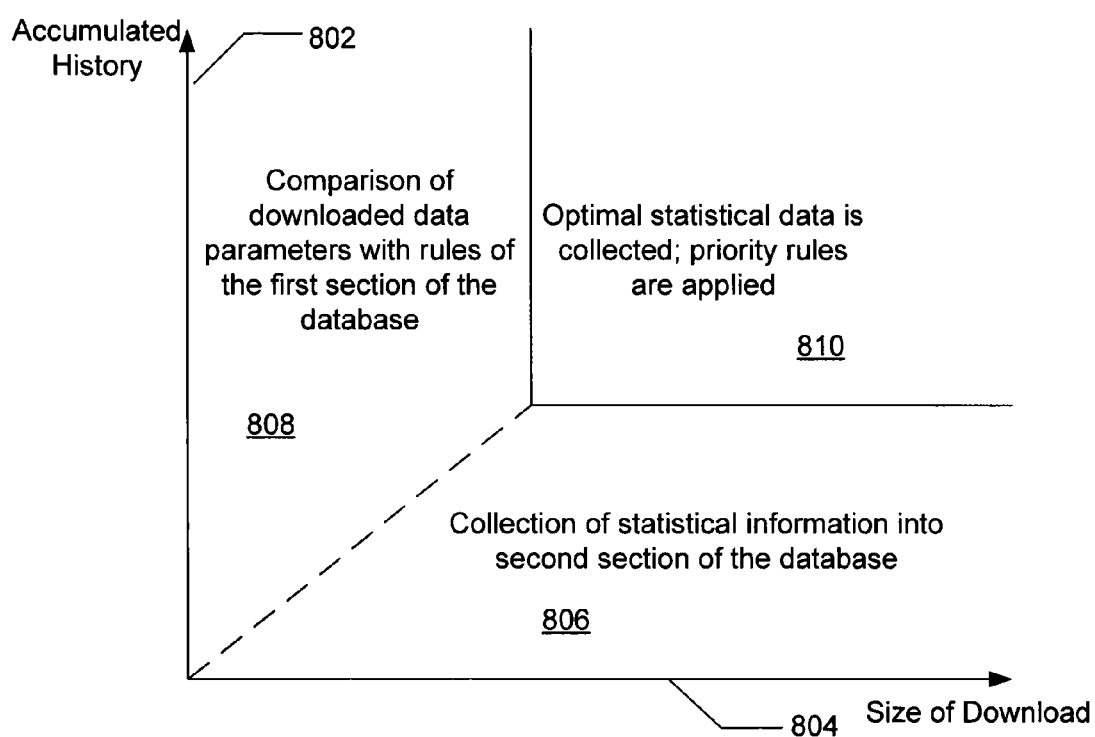
FIG. 8 is a diagram illustrating a decision process for whether, and when, to apply a set of priority rules based on one type of embodiment.

FIG. 8 is a diagram illustrating a decision process according to one embodiment for whether, and when, to apply the set of priority rules. According to the decision process depicted, actions are taken based on an accumulated history 802 associated with a particular source of a download (e.g. a website), or with a particular file (which may have been obtained from numerous different sources). Actions are also taken based on the size of the file presently being downloaded 804. At the initial stage of operation of the system, statistical information is collected and placed in the second section of database 203 of the proxy server, as depicted in region 806. At the same time, data analysis module 204 operates in its primary operation mode as described above, indicated at region 808, in which it determines the parameters of the data that are applicable to the rule set, and applies the rules of the first section of the database 203 of the proxy server to determine the overall risk probability that the downloaded data contains malicious code. During this time, there is either insufficient accumulation of history for the priority rules to be invoked, or the size of the file being downloaded does not present a significant obstacle to fast processing using operation of region 808.

As the statistical data is accumulated, and a "critical mass" of statistical data is reached, the priority rules based on that statistical information may be triggered at region 810 in FIG. 8. In a related embodiment, invocation of the priority rules can also be based on a comparison of the parameters of the downloaded data with the rules of the first section of the database. Applying the exemplary priority rule presented above, for example, if the name of the downloaded file and its checksum match the name and checksum of a file from the second section of the database 203 of the proxy server, which contains statistical information and has been downloaded more than fifty times, and did not contain malicious code, then a priority rule will be invoked. Such a rule might override the usual overall risk probability determination to assign the overall risk probability to the lowest level, thus forcing a minimal-depth antivirus scan by the antivirus module 202. In a related embodiment, a priority rule may bypass antivirus checking altogether in order to increase the speed of data transmission to PC workstation 101.

The priority rules may also apply to increase the level of scrutiny for checking downloaded data at the proxy server. For example, in one embodiment, if the data server 104 has been the source of more than 50 file downloads, and more than 10% of the downloads from that source have included malware, then a priority rule is invoked which overrides the usual overall risk probability determination and sets the overall risk probability to high, which would require a more comprehensive type of screening to be performed. In a related embodiment, a priority rule requires the initiation by the antivirus module 202 of the feedback module 205 for transmission the PC workstation 101 of a notification that the downloaded data contains malicious code. In this case, proxy server 102 can immediately disconnect from the data source, and forgo antivirus scanning by the antivirus module 202.

In various related embodiments, a hierarchy of priority rules is used, in which the depth or thoroughness of antivirus scanning (or other security checks) are set based on the statistical confidence, margin of error, or other measure of accuracy of the statistical prediction of overall risk probability. Thus, for example, if over 250 downloads of a particular file have been logged (having the same checksum or hash value) and those downloads have been from the same source 104 which is not associated with a high incidence of malware being present in data (e.g., <0.5% of the time), then the measure of confidence that this particular file from this particular source is free from malware is quite high. Accordingly, antivirus checking may be skipped in this instance.

In another related embodiment, instead of always skipping the antivirus scan altogether in cases where it is estimated (based on statistical data) that the overall risk probability is very low, proxy server 102 is configured to perform certain scans on a sampling basis. Thus, given a certain confidence measure that a source or a file is deemed safe, antivirus scanning may be performed at a sampling interval of 10% of the time, for example. The sampling interval may be adjustable based on the strength or extent of the statistical data corresponding to the file or source deemed relatively safe.

In one embodiment, proxy server 102 includes a client-specific history database in which records are maintained representing each file transferred to each PC workstation 101. Each entry in the client-specific history database includes an indication of the type and extent of antivirus scans or other security checks, as well as whether (and what type) of treatment was performed for that download. If a file, which had been transferred to one or more PC workstations 101 with reduced, obsolete, or entirely skipped antivirus checks, is later determined to be infected with malware (such as if the file is sampled), the client-specific history database enables proxy server 102 to send notifications, via feedback module 205, to each client. The notifications can include instructions to implement corrective action, such as quarantining of the file and, if possible, instructions on treatment to be applied in order to remove the malware or instructions to initiate a new download from the proxy server to obtain a treated replacement file.

Aspects of the present invention, such as the various embodiments of proxy server 102, and PC workstation 101, can be implemented as part of a computer system of one or more individual computers. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

Figure 9:
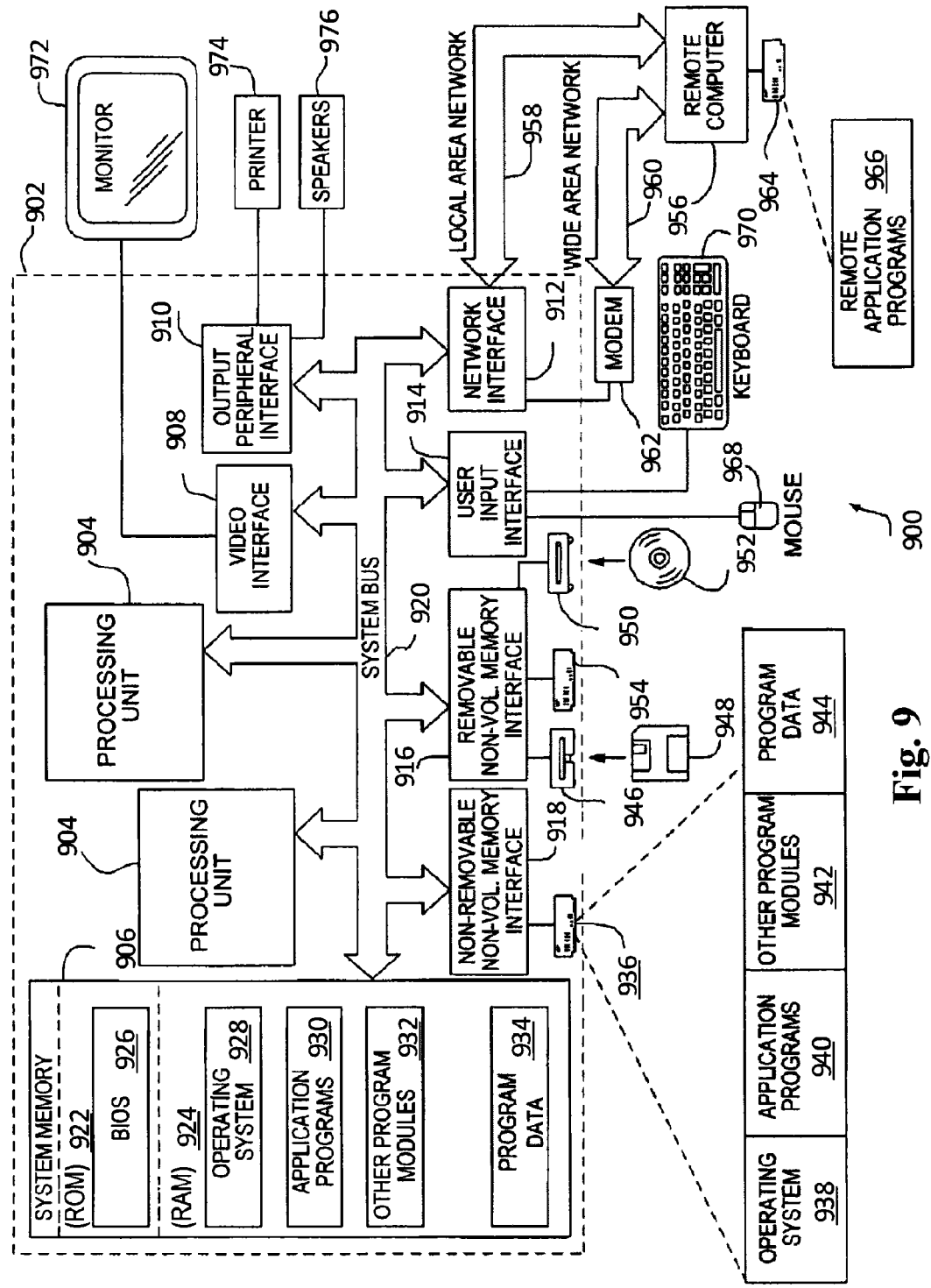
FIG. 9 is a diagram illustrating a computer system on which aspects of the invention as may be implemented according to various embodiments.

FIG. 9 is a diagram illustrating a computer system 900 on which aspects of the invention as described herein may be implemented according to various embodiments. The computer system 900 may include a computing device such as a personal computer 902. The personal computer 902 includes one or more processing units 904, a system memory 906, a video interface 908, an output peripheral interface 910, a network interface 912, a user input interface 914, removable 916 and non-removable 918 memory interfaces and a system bus or high-speed communications channel 920 coupling the various components. In various embodiments, the processing units 904 may have multiple logical cores that are able to process information stored on computer readable media such as the system memory 906 or memory attached to the removable 916 and non-removable memory interfaces 918. The computer 902 system memory 906 may include non-volatile memory such as Read Only Memory (ROM) 922 or volatile memory such as Random Access Memory (RAM) 924. The ROM 922 may include a basic input/output system (BIOS) 926 to help communicate with the other portion of the computer 902. The RAM 924 may store portions of various software applications such as the operating system 928, application programs 930 and other program modules 932. Further, the RAM 924 may store other information such as program or application data 934. In various embodiments, the RAM 924 stores information that requires low-latencies and efficient access, such as programs and data being manipulated or operated on. In various embodiments RAM 924 comprises Double Data Rate (DDR) memory, Error Correcting memory (ECC) or other memory technologies with varying latencies and configurations such as RAMBUS or DDR2 and DDR3. In this way, in various embodiments, the system memory 906 may store the input data store, access credential data store, operating memory data store, instruction set data store, analysis result data store and the operating memory data store. Further, in various embodiments, the processing units 904 may be configured to execute instructions that limit access to the aforementioned data stores by requiring access credential before access to the information is granted.

The removable 916 and non-removable 918 memory interfaces may couple the computer 902 to disk drives 936 such as SSD or rotational disk drives. These disk drives 936 may provide further storage for various software applications such as the operating system 938, application programs 940 and other program modules 942. Further, the disk drives 936 may store other information such as program or application data 944. In various embodiments, the disk drives 936 store information that doesn't require the same low-latencies as in other storage mediums. Further, the operating system 938, application program 940 data, program modules 942 and program or application data 944 may be the same information as that stored in the RAM 924 in various embodiments mentioned above or it may be different data potentially derivative of the RAM 924 stored data.

Further, the removable non-volatile memory interface 916 may couple the computer 902 to magnetic portable disk drives 946 that utilize magnetic media such as the floppy disk 948, Iomega® Zip or Jazz, or optical disk drives 950 that utilize optical media 952 for storage of computer readable media such as Blu-Ray®, DVD-R/RW, CD-R/RW and other similar formats. Other embodiments utilize SSD or rotational disks housed in portable enclosures 954 to increase the capacity of removable memory. Still other embodiments utilize removable Flash non-volatile memory devices that are interfaced with using a card reader device.

The computer 902 may utilize the network interface 912 to communicate with one or more remote computers 956 over a local area network (LAN) 958 or a wide area network (WAN) 960. The network interface 912 may utilize a Network Interface Card (NIC) or other interface such as a modem 962 to enable communication. The modem 962 may enable communication over telephone lines, coaxial, fiber optic, powerline, or wirelessly. The remote computer 956 may contain a similar hardware and software configuration or may have a memory 964 that contains remote application programs 966 that may provide additional computer readable instructions to the computer 902. In various embodiments, the remote computer memory 964 can be utilized to store information such as identified file information that may be later downloaded to local system memory 906. Further, in various embodiments the remote computer 956 may be an application server, an administrative server, client computers, or a network appliance.

A user may enter information to the computer 902 using input devices connected to the user input interface 914 such as a mouse 968 and keyboard 970. Additionally, the input device may be a trackpad, fingerprint scanner, joystick, barcode scanner, media scanner or the like. The video interface 908 may provide visual information to a display such as a monitor 972. The video interface 908 may be an embedded interface or it may be a discrete interface. Further, the computer may utilize a plurality of video interfaces 908, network interfaces 912 and removable 916 and non-removable 918 interfaces in order to increase the flexibility in operation of the computer 902. Further, various embodiments utilize several monitors 972 and several video interfaces 908 to vary the performance and capabilities of the computer 902. Other computer interfaces may be included in computer 902 such as the output peripheral interface 910. This interface may be coupled to a printer 974 or speakers 976 or other peripherals to provide additional functionality to the computer 902.

Various alternative configurations and implementations of the computer 902 are within the spirit of the invention. These variations may include, without limitation, additional interfaces coupled to the system bus 920 such as universal serial bus (USB), printer port, game port, PCI bus, PCI Express or integrations of the various components described above into chipset components such as the northbridge or southbridge. For example, in various embodiments, the processing unit 904 may include an embedded memory controller (not shown) to enable more efficient transfer of data from the system memory 906 than the system bus 920 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented apparatus for facilitating data transfer over a network between a destination computer system and a data source, the apparatus comprising:
  an intermediate computer system including a processor circuit operatively coupled with a data storage circuit and network interface circuitry that is adapted to be communicatively coupled to a computer network, the data storage circuit containing instructions that, when executed on the processor circuit, cause the computer system to implement:
   a data reception module adapted to obtain, via the network interface circuitry, a data item to be received from the data source in response to a request by the destination computer system;
   a data transmission module adapted to conditionally transmit, via the network interface circuitry, the data item to the destination computer system, wherein transmission of the data item is conditioned on a result of a security evaluation;
   an antivirus module adapted to perform the security evaluation on the data item according to selectable ones of a plurality of malware detection techniques, wherein the plurality of malware detection techniques include at least one technique which is relatively computationally easy, and at least one technique which is relatively computationally difficult;

a data analysis module adapted to:
  collect a plurality of parameters that represent various indicia of malware risk relating to the data item;
  collect statistical information relating to previous malware detection results for the data item and/or the data source; and
  calculate, based on the plurality of parameters and on the statistical information, an overall risk probability of whether the data item is infected with malware, wherein calculation of the overall risk probability is computationally easier than the at least one relatively computationally easy malware detection technique;
wherein the antivirus module is further adapted to selectively apply at least one malware detection technique from among the plurality of malware detection techniques based on the overall risk probability such that the selectively applied at least one malware detection technique has a level of computational difficulty that corresponds to the overall risk probability; and
wherein the data analysis module is further adapted to analyze the statistical information relating to the previous malware detection results for the data item and/or the data source and, if the statistical information meets predetermined confidence criteria, to invoke at least one priority rule that forces a certain malware detection technique notwithstanding the overall risk probability.

2. The apparatus of claim 1, wherein the intermediate computer system is configured as a proxy server through which the destination computer system accesses a plurality of other data sources in addition to said data source.

3. The apparatus of claim 1, wherein the data item is a file, the data source is a website, and wherein the computer network is the Internet.

4. The apparatus of claim 1, wherein the plurality of detection techniques includes at least virus signature analysis and heuristic analysis.

5. The apparatus of claim 1, wherein the plurality of detection techniques includes detection techniques of varying depths.

6. The apparatus of claim 1, wherein the plurality of detection techniques includes an omission of an antivirus detection process.

7. The apparatus of claim 1, wherein the overall risk probability is expressed in terms of fuzzy logic.

8. The apparatus of claim 1, wherein the various indicia of malware risk relating to the data item include at least one of: a security threat level, characteristics of the data item, and/or characteristics of the data source.

9. The apparatus of claim 1, wherein the overall risk probability is based on a statistical aggregation of the plurality of parameters.

10. The apparatus of claim 1, wherein in response to a relatively high overall risk probability, the antivirus module is adapted to selectively apply a malware detection technique that requires a full download of the data item into a cache of the intermediate computer system, and requires a complete malware scan of the data item prior to authorizing transmission of the data item to the destination computer system.

11. The apparatus of claim 10, wherein the antivirus module is further adapted to issue a notification to be displayed on the destination computer system in response to the relatively high overall risk probability, the notification being informative of a progress of the full download of the data item into the cache of the intermediate computer system and a progress of further malware scan.

12. The apparatus of claim 1, wherein the antivirus module is adapted such that, in response to a relatively low overall risk probability, the antivirus module selectively applies a malware detection technique that permits portions of the data item to be transmitted to the destination computer system during a malware scan of other portions of the data item.

13. The apparatus of claim 1, wherein in response to a detection of malware by the antivirus module, the data transmission module transmits instructions to the destination computer system for responding to the malware.

14. The apparatus of claim 1, wherein the at least one priority rule forces either a decreased intensity malware detection technique, or an increased intensity malware detection technique relative to the malware detection technique that corresponds to the overall risk probability.

15. In a proxy server implemented as a computer system having hardware configured to operate under software control, a method for automatically screening a data item requested to be downloaded to a destination computer from a data source, the method comprising:
  performing, by the proxy server, a security evaluation on the data item according to selectable ones of a plurality of malware detection techniques, wherein the plurality of malware detection techniques include at least one technique which is relatively computationally easy, and at least one technique which is relatively computationally difficult;
  collecting, by the proxy server, a plurality of parameters that represent various indicia of malware risk relating to the data item;
  collecting, by the proxy server, statistical information relating to previous malware detection results for the data item and/or the data source; and
  calculating, by the proxy server, based on the plurality of parameters and on the statistical information, an overall risk probability of whether the data item is infected with malware, wherein calculation of the overall risk probability is generally computationally easier than the at least one relatively computationally easy malware detection technique;
  selectively applying, by the proxy server, at least one malware detection technique from among the plurality of malware detection techniques based on the overall risk probability, wherein the at least one malware detection technique has a level of computational difficulty that generally corresponds to the overall risk probability; and
  analyzing, by the proxy server, the statistical information relating to the previous malware detection results for the data item and/or the data source and, if the statistical information meets predetermined confidence criteria, invoking at least one priority rule that forces a certain malware detection technique notwithstanding the overall risk probability.

16. A computer-implemented apparatus for facilitating data transfer over a network between a destination computer system and a data source, the apparatus comprising:
  means for performing a security evaluation on the data item according to selectable ones of a plurality of malware detection techniques, wherein the plurality of malware detection techniques include at least one technique which is relatively computationally easy, and at least one technique which is relatively computationally difficult;
  means for collecting a plurality of parameters that represent various indicia of malware risk relating to the data item;

means for collecting statistical information relating to previous malware detection results for the data item and/or the data source; and means for calculating based on the plurality of parameters and on the statistical information, an overall risk probability of whether the data item is infected with malware, wherein calculation of the overall risk probability is computationally easier than the at least one relatively computationally easy malware detection technique;

means for selectively applying at least one malware detection technique from among the plurality of malware detection techniques based on the overall risk probability, wherein the at least one malware detection technique has a level of computational difficulty that corresponds to the overall risk probability; and means for analyzing the statistical information relating to the previous malware detection results for the data item and/or the data source and, if the statistical information meets predetermined confidence criteria, invoking at least one priority rule that forces a certain malware detection technique notwithstanding the overall risk probability.

\* \* \* \* \*